United States Patent
Saito et al.

(10) Patent No.: US 10,883,065 B2
(45) Date of Patent: Jan. 5, 2021

(54) REFRIGERATION OIL COMPOSITION AND WORKING FLUID FOR REFRIGERATION SYSTEM

(71) Applicant: JAPAN SUN OIL COMPANY, LTD., Tokyo (JP)

(72) Inventors: Rei Saito, Tokyo (JP); Ryoichi Nakano, Tokyo (JP); Hiei Nanso, Tokyo (JP)

(73) Assignee: JAPAN SUN OIL COMPANY, LTD., Tokyo (JP)

( * ) Notice: Subject to any disclaimer, the term of this patent is extended or adjusted under 35 U.S.C. 154(b) by 0 days.

(21) Appl. No.: 16/491,058

(22) PCT Filed: May 2, 2018

(86) PCT No.: PCT/JP2018/017556
§ 371 (c)(1),
(2) Date: Sep. 4, 2019

(87) PCT Pub. No.: WO2018/207709
PCT Pub. Date: Nov. 15, 2018

(65) Prior Publication Data
US 2020/0017795 A1  Jan. 16, 2020

(30) Foreign Application Priority Data

May 9, 2017  (JP) ................................. 2017-093267
Sep. 4, 2017  (JP) ................................. 2017-169519

(51) Int. Cl.
*C09K 5/04* (2006.01)
*C10M 169/04* (2006.01)
(Continued)

(52) U.S. Cl.
CPC ......... *C10M 169/041* (2013.01); *C09K 5/041* (2013.01); *C09K 5/045* (2013.01);
(Continued)

(58) Field of Classification Search
CPC ...... C10M 2207/2835; C10M 171/008; C10M 2203/1065; C10M 105/38; C10M 2209/109; C10N 2020/02; C10N 2040/30
See application file for complete search history.

(56) References Cited

U.S. PATENT DOCUMENTS 5,403,503 A    4/1995  Seiki et al.
6,074,573 A    6/2000  Kaneko
(Continued)

FOREIGN PATENT DOCUMENTS

CN    101400769    4/2009
CN    104039939    9/2014
(Continued)

OTHER PUBLICATIONS

Decision of Refusal issued in Japanese Patent Application No. 2019-517598, dated Sep. 3, 2019, 7 pages including English translation.

(Continued)

*Primary Examiner* — John R Hardee
(74) *Attorney, Agent, or Firm* — Hamre, Schumann, Mueller & Larson, P.C.

(57) ABSTRACT

A refrigeration oil composition includes: a mixture of a naphthenic mineral oil and at least one of a polyol ester oil and a polyvinyl ether oil; and at least one of a sorbitan compound and a glycerin fatty acid ester and a working fluid for a refrigeration system includes: the refrigeration oil composition; and one or more refrigerants selected from a hydrofluorocarbon refrigerant, a hydrofluoroolefin refrigerant and a carbon dioxide refrigerant.

10 Claims, 2 Drawing Sheets

(51) Int. Cl.
*C10M 101/02* (2006.01)
*C10M 105/38* (2006.01)
*C10M 107/24* (2006.01)
*C10M 111/02* (2006.01)
*C10M 111/04* (2006.01)
*C10M 129/74* (2006.01)
*C10M 145/38* (2006.01)
*C10N 20/02* (2006.01)
*C10N 40/30* (2006.01)

(52) U.S. Cl.
CPC ........ *C10M 101/02* (2013.01); *C10M 105/38* (2013.01); *C10M 107/24* (2013.01); *C10M 111/02* (2013.01); *C10M 111/04* (2013.01); *C10M 129/74* (2013.01); *C10M 145/38* (2013.01); *C10M 169/04* (2013.01); *C09K 2205/106* (2013.01); *C09K 2205/122* (2013.01); *C09K 2205/126* (2013.01); *C10M 2203/1065* (2013.01); *C10M 2207/2835* (2013.01); *C10M 2209/043* (2013.01); *C10M 2209/109* (2013.01); *C10N 2020/02* (2013.01); *C10N 2040/30* (2013.01)

(56) References Cited

U.S. PATENT DOCUMENTS

| | | | |
|---|---|---|---|
| 6,736,991 | B1 | 5/2004 | Cohen et al. |
| 2001/0011716 | A1 | 8/2001 | Kaneko et al. |
| 2007/0032391 | A1 | 2/2007 | Tagawa et al. |
| 2007/0155635 | A1 | 7/2007 | Tagawa et al. |
| 2009/0062167 | A1 | 3/2009 | Kaneko |
| 2010/0234256 | A1 | 9/2010 | Sato et al. |
| 2014/0374647 | A1 | 12/2014 | Saito et al. |
| 2015/0014574 | A1 | 1/2015 | Saito et al. |
| 2015/0252281 | A1 | 9/2015 | Saito et al. |
| 2017/0002243 | A1 | 1/2017 | Porter et al. |

FOREIGN PATENT DOCUMENTS

| | | |
|---|---|---|
| JP | H08-085798 | 4/1996 |
| JP | 10-008078 | 1/1998 |
| JP | H10-147682 | 6/1998 |
| JP | 11-263992 | 9/1999 |
| JP | WO2005-012469 | 9/2007 |
| JP | WO2005-012467 | 10/2007 |
| JP | 2008-138135 | 6/2008 |
| JP | 2010-138265 | 6/2010 |
| JP | WO2009-066722 | 4/2011 |
| JP | 2011-140642 | 7/2011 |
| JP | 5089151 B | 9/2012 |
| JP | 2014-047267 | 3/2014 |
| JP | WO2013-129579 | 7/2015 |
| JP | 2016-050226 | 4/2016 |
| TW | 399095 | 7/2000 |
| TW | 201533232 | 9/2015 |
| WO | 91/09097 | 6/1991 |
| WO | 2005/012467 | 2/2005 |
| WO | 2005/012469 | 2/2005 |
| WO | 2009/066722 | 5/2009 |
| WO | 2009/074664 | 6/2009 |
| WO | 2011/070140 | 6/2011 |
| WO | 2013/129579 | 9/2013 |

OTHER PUBLICATIONS

International Search Report issued in International Application No. PCT/JP2018/017556, dated Jun. 12, 2018, 5 pages.
Written Opinion issued in International Application No. PCT/JP2018/017556, dated Jun. 12, 2018, 6 pages.
Office Action issued in Japanese Patent Application No. 2019-517598, dated Jun. 18, 2019, 9 pages.
Reexamination report before trial issued for Japanese Patent Application No. 2019-517598, dated Dec. 20, 2019, 4 pages including English translation.
Notice of Reasons for Refusal issued for Japanese Patent Application No. 2019-517598, dated Jan. 21, 2020, 8 pages including English translation.
Office Action issued for Indian Patent Application No. 201917036022, dated Jun. 24, 2020, 7 pages.
Office Action issued for Taiwanese Patent Application No. 107115597, dated May 5, 2020, 12 pages including English translation.
Office Action issued for Chinese Patent Application No. 201710918586.3, dated Nov. 4, 2020, 22 pages including machine translation.

| DETERMINATION CRITERIA | | |
|:---:|:---:|:---:|
| ◎ | ○ | × |

1

REFRIGERATION OIL COMPOSITION AND WORKING FLUID FOR REFRIGERATION SYSTEM

TECHNICAL FIELD

The present invention relates to a working fluid for a refrigeration system containing a base oil containing a naphthenic mineral oil and a refrigerant.

BACKGROUND ART

As a working fluid for a refrigeration system, one containing a refrigeration oil containing a mineral oil and a conventional hydrochlorofluorocarbon (HCFC) refrigerant containing a chlorine are known. Among mineral oils, a naphthenic mineral oil has been suitably used from the viewpoint of excellent low-temperature fluidity and the like. However, a hydrofluorocarbon (HFC) refrigerant containing no chlorine is used from the viewpoint of ozone layer protection, and an ester-based refrigeration oil such as a polyol ester oil is widely used as a refrigeration oil easily soluble with the refrigerant.

When a mineral oil is used for the hydrofluorocarbon refrigerant, the amount of refrigerant charged is reduced and the cost of a refrigeration oil is significantly reduced as compared to a polyol ester oil. However, there is a problem that the refrigeration oil in the compressor is in insufficient and poor lubrication occurs since the refrigeration oil remains in the heat exchanger and piping of the refrigeration cycle due to the extremely low solubility of the mineral oil with the hydrofluorocarbon refrigerant.

Thus, the present applicant has shown that a lubricity and a solubility of a refrigerant can be improved by using a mixture of a naphthenic mineral oil and a polyol ester oil in Patent Document 1.

Moreover, a polyvinyl ether oil is used as a base oil of a refrigeration oil, and a mixture of a polyvinyl ether oil and a mineral oil is also used as a base oil (see, for example, Patent Document 2). In Patent Document 2, a polyvinyl ether oil excellent in compatibility with a refrigerant such as R410A is described.

CITATION LIST

Patent Literature

Patent Literature 1: Japanese Patent No. 5089151
Patent Literature 2: JP-A-2014-47267

SUMMARY OF INVENTION

Technical Problem

However, as a result of further studies by the present inventors, it has been found that a heat exchange efficiency may decrease with time depending on the refrigeration system in which the compatibility with the refrigerant is enhanced and the lubrication and oil return performance can be improved by using a naphthenic mineral oil in combination with a polyol ester oil or a polyvinyl ether oil. It has also been found that the production cost of the entire refrigeration oil composition can be reduced as the proportion of the naphthenic mineral oil increases, but the heat exchange efficiency decreases as the proportion of the naphthenic mineral oil increases.

2

Therefore, the present invention provides a working fluid for a refrigeration system that mixed a hydrofluorocarbon refrigerant containing no chlorine or the like into a mixture of a naphthenic mineral oil and a polyol ester oil or a polyvinyl ether oil, and an object of the present invention is to suppress adhesion of the mixed oil to a heat exchanger or piping and excellently maintain the performance of the refrigeration device for a long time regardless of the type thereof.

Solution to Problem

From the result of the studies by the present inventors, it has been found that the naphthenic mineral oil which hardly dissolves with the refrigerant adheres to the inner surface of the heat exchanger and remains and an increase in adhesion amount and residual amount over time which hinders heat exchange which are reasons of reduction of the heat exchange efficiency described above, and mixing and using a polyol ester oil or a polyvinyl ether oil and further adding a sorbitan compound or a glycerin fatty acid ester is effective to suppress adhesion of the naphthenic mineral oil. That is, the present invention provides the following refrigeration oil composition and the following working fluid for a refrigeration system.

(1) A refrigeration oil composition including: a mixture of naphthenic mineral oil and at least one of a polyol ester oil and a polyvinyl ether oil; and at least one of a sorbitan compound and a glycerin fatty acid ester.
(2) The refrigeration oil composition according to the above (1), including the mixture of the naphthenic mineral oil and the polyol ester oil, and the sorbitan compound.
(3) The refrigeration oil composition according to the above (1), including the mixture of the naphthenic mineral oil and the polyvinyl ether oil, and the at least one of the sorbitan compound and the glycerin fatty acid ester.
(4) The refrigeration oil composition according to any one of the above (1) to (3), in which in the mixture, a mass ratio of the naphthenic mineral oil to the at least one of the polyol ester oil and the polyvinyl ether oil is that the naphthenic mineral oil:the at least one of the polyol ester oil and the polyvinyl ether oil=from 60:40 to 90:10.
(5) The refrigeration oil composition according to any one of the above (1) to (4), in which a content of the at least one of the sorbitan compound and the glycerin fatty acid ester is from 0.5 mass % to 5 mass % of a total amount of the refrigeration oil composition.
(6) The refrigeration oil composition according to any one of the above (1) to (5), in which a kinematic viscosity of the naphthenic mineral oil at 40° C. is from 5 mm$^2$/s to 460 mm$^2$/s, and a kinematic viscosity of the at least one of the polyol ester oil and the polyvinyl ether oil at 40° C. is from 5 mm$^2$/s to 350 mm$^2$/s.
(7) The refrigeration oil composition according to any one of the above (1) to (6), in which the sorbitan compound is a compound of a polyoxyethylene, a sorbitan and a fatty acid.
(8) The refrigeration oil composition according to any one of the above (1) to (7), comprising an oil discharge inhibitor for suppressing discharge of the mixture from a compressor.
(9) A working fluid for a refrigeration system including: the refrigeration oil composition according to any one of the above (1) to (8); and one or more refrigerants selected from a hydrofluorocarbon refrigerant, a hydrofluoroolefin refrigerant and a carbon dioxide refrigerant.

Advantageous Effects of Invention

The working fluid for a refrigeration system in the present invention can suppress adhesion of the naphthenic mineral oil to the inner surface of the heat exchanger and excellently maintain the performance of the refrigeration device for a long time regardless of the type thereof by adding a sorbitan compound or a glycerin fatty acid ester to a mixture of the naphthenic mineral oil and a polyol ester oil or a polyvinyl ether oil.

DESCRIPTION OF EMBODIMENTS

Figure 1:
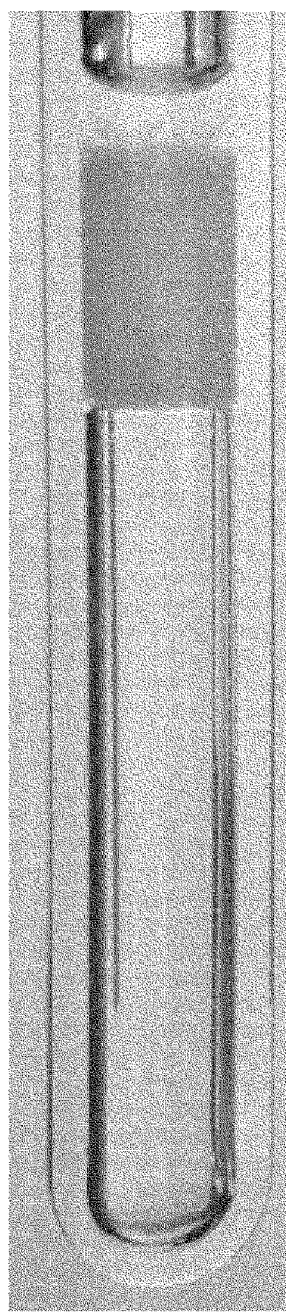
FIG. 1 is a photograph showing criteria in the adhesion test.

Hereinafter, embodiments of the present invention will be described in detail.
(Refrigeration Oil Composition)
In the refrigeration oil composition of the present invention, a mixture of a naphthenic mineral oil and at least one of a polyol ester oil and a polyvinyl ether oil (hereinafter sometimes referred to as a "second lubricating oil") is used as a base oil. Although the naphthenic mineral oil is excellent in electrical insulation, hygroscopicity, etc., there is a problem in compatibility with a refrigerant, so that a second lubricating oil excellent in compatibility with various refrigerants is mixed.

With regard to a mixing ratio of the naphthenic mineral oil to the second lubricating oil, an amount of a charged refrigerant and a production cost of an entire refrigeration oil composition can be reduced as a proportion of the naphthenic mineral oil increases. However, the greater the proportion of the naphthenic mineral oil, the lower the compatibility with the refrigerant and the lower the heat exchange efficiency. In consideration of these, a mass ratio of the naphthenic mineral oil to the second lubricating oil is preferably from 60:40 to 90:10 and more preferably from 70:30 to 80:20.

In addition, it has been known that the naphthenic mineral oil is superior to other mineral oils in electrical insulation, low hygroscopicity, hydrolysis resistance, lubricity, solubility to impurities such as process oil, low temperature fluidity, etc. It is preferable that a density at 15° C. is 0.89 g/cm³ or more, more preferably 0.90 g/cm³ or more, in order to express these various properties better. When the density is less than 0.89 g/cm³, it is inferior in lubrication and oil return properties. For the same reason, a kinematic viscosity at 40° C. is preferably from 15 to 100 mm²/s when used for an air conditioner, and is preferably from 100 to 460 mm²/s when used for a high temperature heat pump such as a waste heat recovery device. The kinematic viscosity can select suitably in the range according to the type thereof for a refrigerant device which uses other working fluid.

Furthermore, the naphthenic mineral oil preferably has an aniline point of 85° C. or less, more preferably 80° C. or less, in order to enhance the solubility to impurities.

When a paraffinic carbon number is % $C_P$, a naphthenic carbon number is % $C_N$ and an aromatic carbon number is % $C_A$ in the naphthenic mineral oil during ring analysis of the mineral oil, the mineral oil has a naphthenic carbon number (% $C_N$) of 30 to 45 in the total carbon number, and the mineral oil in the present invention is not limited as long as the mineral oil is in the range of this % $C_N$. In addition, it is preferable to use one that is refined by appropriately combining treatments such as solvent deasphalting, solvent extraction, hydrocracking, solvent dewaxing, catalytic dewaxing, hydrorefining, sulfuric acid washing, and clay treatment.

On the other hand, among the polyol ester oils as the second lubricating oil, an ester of a diol or a polyol having 3 to 20 hydroxyl groups and a monovalent or divalent fatty acid having 6 to 18 carbon atoms are preferable.

The diol preferably has 2 to 12 carbon atoms. Specifically, examples thereof include ethylene glycol, 1,3-propanediol, propylene glycol, 1,4-butanediol, 1,2-butanediol, 2-methyl-1,3-propanediol, 1,5-pentanedial, neopentyl glycol, 1,6-hexanediol, 2-ethyl-2-methyl-1,3-propanediol, 1,7-heptanediol, 2-methyl-2-propyl-1,3-propanediol, 2,2-diethyl-1,3-propanediol, 1,8-octadiol, 1,9-nonanediol, 1,10-decanediol, 1,11-undecanediol, 1,12-dodecanediol, and the like. The polyol preferably has 3 to 60 carbon atoms. Specifically, examples thereof include polyhydric alcohols such as trimethylol ethane, trimethylol propane, trimethylol butane, di-(trimethylol propane), tri-(trimethylol propane), pentaerythritol, di-(pentaerythritol), tri-(pentaerythritol), glycerin, polyglycerin (2 to 20 mers of glycerin), pentanetriol, sorbitol, sorbitan, sorbitol glycerin condensate, adonitol, arabitol, xylitol, mannitol; saccharide such as xylose, arabinose, ribose, rhamnose, glucose, fructose, galactose, mannose, sorbose, cellobiose, maltose, isomaltose, trehalose, sucrose, rafuinose, gentianose, meresitose; partial etherified products thereof; methyl glucoside (glycoside); and the like. Specifically, examples of fatty acids include linear or branched ones such as hexanoic acid, heptanoic acid, octanoic acid, nonanoic acid, decanoic acid, undecanoic acid, dodecanoic acid, tridecanoic acid, tetradecanoic acid, pentadecanoic acid, hexadecanoic acid, heptadecanoic acid, octadecanoic acid, oleic acid, or so-called neo acids having a quaternary a carbon atom. The polyol ester oil may also have free hydroxyl groups.

Particularly preferred polyol ester oils are esters of hindered alcohols such as neopentyl glycol, trimethylol ethane, trimethylol propane, trimethylol butane, di-(trimethylol propane), tri-(trimethylol propane), pentaerythritol, di-(pentaerythritol), tri-(pentaerythritol), and the like. Specifically, examples include trimethylolpropane caprylate, trimethylolpropane pelargonate, pentaerythritol-2-ethylhexanoate and pentaerythritol pelargonate. From the viewpoint of kinematic viscosity and hydrolysis resistance, an ester of a polyol having 3 to 10 carbon atoms and a fatty acid having 4 to 10 carbon atoms are preferred.

In addition, in order to ensure good lubricity, the kinematic viscosity at 40° C. of the polyol ester oil is preferably from 5 to 68 mm²/s and more preferably 7 to 46 mm²/s when used in an air conditioner. When used for a high temperature heat pump such as a waste heat recovery device, the kinematic viscosity at 40° C. is preferably from 68 to 350 mm²/s. Furthermore, a pour point is preferably −25° C. or less, more preferably −35° C. or less.

The polyvinyl ether oil which is also the second lubricating oil is, for example, one having a structural unit represented by the General Formula (1).

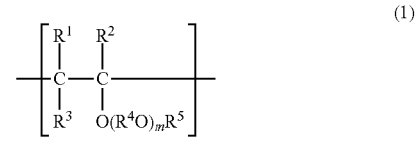

In the formula, $R^1$, $R^2$ and $R^3$ may be the same or different and each represents a hydrogen atom or a hydrocarbon group having 1 to 8 carbon atoms, $R^4$ represents a divalent hydrocarbon group having 1 to 10 carbon atoms or a divalent ether-bonded oxygen-containing hydrocarbon group having 2 to 20 carbon atoms, $R^5$ represents a hydrocarbon group having 1 to 20 carbon atoms, m represents a number such that the average value of m for the polyvinyl ether is 0 to 10, $R^1$ to $R^5$ may be the same or different for each structural unit, and when m is 2 or more in one structural unit, a plurality of $R^4O$ in the structural unit may be the same or different.

The polyvinyl ether oil may be a homopolymer having the same structural unit thereof, or may be a copolymer composed of two or more structural units. The polyvinyl ether oil to be the copolymer is preferable since the properties can be adjusted in a well-balanced manner.

The kinematic viscosity and the pour point of the polyvinyl ether oil is preferably similar to those of the polyol ester oil.

For the second lubricating oil, the polyol ester oil and the polyvinyl ether oil may be used alone or in combination.

In order to further enhance the compatibility of the naphthenic mineral oil with the refrigerant and to suppress the adhesion of the naphthenic mineral oil to the inner wall of the piping, at least one of a sorbitan compound and a glycerin fatty acid ester is added to the mixture of the naphthenic mineral oil and the second lubricating oil described above. That is, the sorbitan compound and the glycerin fatty acid ester function as anti-adhesion agents for the naphthenic mineral oil. The dosage amount is not limited as long as the dosage amount is an effective amount to improve the compatibility with the refrigerant and to suppress the adhesion of the naphthenic mineral oil, and is preferably from 0.5 mass % to 5 mass % of the total amount of the refrigeration oil composition. In addition, when both are used in combination, the content is the total amount. When the dosage amount is less than 0.5 mass %, the effect may be insufficient depending on the refrigeration device, and when the dosage amount exceeds 5 mass %, the effect is saturated. This is uneconomical, and also the lubricating performance or the like may not be obtained sufficiently since the amount of mixed oil is relatively reduced.

The sorbitan compound has a functional group derived from sorbitan in the molecular structure thereof, and as a compound particularly effective for improving a compatibility with a refrigerant, examples include a compound of polyoxyethylene, sorbitan and a fatty acid. Specifically, examples thereof include a polyoxyethylene sorbitan ester and a polyoxyethylene sorbitol fatty acid ester.

As a glycerin fatty acid ester, examples include glycerin monooleate, glycerin monolinoleate, or the like, and a mixture thereof may be used.

The combination of the base oil and the additive is preferably (1) a combination of a mixture of a naphthenic mineral oil and a polyol ester oil, and a sorbitan compound, and (2) a combination of a mixture of a naphthenic mineral oil and a polyvinyl ether oil, and at least one of the sorbitan compound and the glycerin fatty acid ester, and the compatibility of the naphthenic mineral oil with the refrigerant can be further enhanced and adhesion to the inner wall of the piping can be further suppressed.

In addition to the sorbitan compound and glycerin fatty acid ester, commonly used additives may be added to the refrigeration oil composition of the present invention. For example, an epoxy compound such as a phenylglycidyl ether, a butylphenyl glycidyl ether, and an epoxidized vegetable oil as a scavenger of active substances such as acidic substances and radicals, a phenolic or amine antioxidant, an oiliness agent for higher alcohols and higher fatty acids, a metal deactivator such as benzotriazole, an antiwear agent or extreme pressure agent such as various phosphates, acid phosphates, phosphites, phosphines, sulfuric esters, sulfides, and thiophenes, can be added alone or in combination of two or more. The dosage amount of these other additives is not particularly limited, but may be in a normal range.

In addition, it is preferable to add an oil discharge inhibitor as another additive. The working fluid for the refrigeration system is condensed and evaporated repeatedly and circulates in the refrigeration cycle. However, it is desirable that only the refrigerant is discharged from the compressor and the refrigeration oil remains as it is in order to enhance the stability of the refrigeration cycle. Therefore, in order to suppress the discharge of the above-mentioned mixed oil, polyisobutylene, polymethacrylate, polyacrylate, polyacrylamide, polybutene, polystyrene, ethylene-propylene copolymer, styrene-butadiene copolymer, and the like, preferably polyisobutylene and polymethacrylate, are added as the oil discharge inhibitor. An average molecular weight of these oil discharge inhibitors is, for example, about from 5,000 to 3,000,000 for polyisobutylene and about 20,000 to 1,500,000 for polymethacrylate. The dosage amount is preferably from 0.01 mass % to 0.5 mass % of the total amount of the refrigeration oil composition. When the dosage amount is less than 0.01 mass %, the effect of suppressing the discharge of the mixture is insufficient; and when the dosage amount exceeds 0.5 mass %, the stability of the refrigeration oil composition may be adversely affected.

(Working Fluid for Refrigeration System)

The present invention also relates to a working fluid for a refrigeration system containing the above-mentioned refrigeration oil composition and a refrigerant.

As the refrigerant, in addition to a carbon dioxide refrigerant, preferred are difluoromethane (HFC-32), trifluoromethane (HFC-23), pentafluoroethane (HFC-125), 1,1,2,2-tetrafluoroethane (HFC-134) 1,1,1,2-tetrafluoroethane (HFC-134a), 1,1-difluoroethane (HFC-152a), or a hydrofluorocarbon refrigerant (HFC refrigerant) such as a mixed refrigerant thereof; and a trifluoroethene (HFO)-1123), trans-1,3,3,3-tetrafluoropropene (HFO-1234ze(E)), 2,3,3,3-tetrafluoropropene (HFO-1234yf), 3,3,3-trifluoropropene (HFO-1243zf), cis-1,1,1,4,4,4-hexafluoro-2-butene (HFO-1336mzz(Z)), or a hydrofluoroolefin refrigerant (HFO refrigerant) such as a mixed refrigerant thereof. The HFO refrigerant has a low global warming potential and is considered to be the mainstream in the future.

The mixing ratio of the refrigeration oil composition to the refrigerant is not particularly limited and may be appropriately set depending on the application. Usually, the refrigeration oil composition:refrigerant=5:95 to 80:20, and the range may be used in the present invention.

The above-mentioned working fluid for a refrigeration system can be widely used for a refrigerator, a freezer, a water heater, various air conditioners, a waste heat recovery device, or the like. It is particularly preferable to apply the working fluid for the refrigeration system to a heat pump type refrigeration/heating device which includes a compressor, a condenser or a gas cooler, an expansion mechanism, and an evaporator, and is cooled by a refrigeration cycle and heated by a heat pump cycle.

EXAMPLES

Hereinafter, the present invention will be further described with reference to Examples and Comparative Examples.

(Test 1)

In the test, a compatibility with a refrigerant was evaluated. Naphthenic oil-A and Naphthenic oil-B shown in Table 1 as a naphthenic mineral oil and POE-A and POE-B also shown in Table 1 as a polyol ester oil are prepared, and base oil A and base oil B were prepared at the combinations and mixing ratios shown in Table 2.

TABLE 1

|  |  | Naphthenic oil-A | Naphthenic oil-B | POE-A | POE-B |
|---|---|---|---|---|---|
| Density, 15° C. | g/cm$^3$ | 0.9086 | 0.9191 | 0.9189 | 0.9653 |
| Color, | ASTM | L0.5 | L0.5 | L0.5 | L0.5 |
| Flash point, COC | ° C. | 178 | 188 | 178 | 270 |
| Pour point, | ° C. | −40 | −35 | −55 or below | 2.5 |
| Kinematic viscosity, 40° C. | mm$^2$/s | 29.29 | 55.34 | 7.474 | 43.77 |
| Kinematic viscosity, 100° C. | mm$^2$/s | 4.434 | 6.108 | 2.045 | 6.186 |
| Viscosity index |  | 22 | 22 | 48 | 82 |
| Total acid number, | mgKOH/g | 0.01 | 0.01 | 0.01 | 0.01 |
| Water content, | ppm | 25 | 25 | 25 | 25 |
| Aniline point, | ° C. | 77.5 | 79.6 | — | — |
| Ring analysis, | % C$_A$ | 16 | 18 | — | — |
|  | % C$_N$ | 35 | 32 | — | — |
|  | % C$_P$ | 49 | 50 | — | — |

TABLE 2

|  |  | Base oil A | Base oil B |
|---|---|---|---|
| Naphthenic oil-A | mass % | — | 80 |
| Naphthenic oil-B | mass % | 80 | — |
| POE-A | mass % | 20 | — |
| POE-B | mass % | — | 20 |
| Density at 15° C. | g/cm$^3$ | 0.9211 | 0.9235 |
| Color | ASTM | L0.5 | L0.5 |
| Flash point, COC | ° C. | 196 | 194 |
| Pour point, | ° C. | −40 | −40 |
| Kinematic viscosity, 40° C. | mm$^2$/s | 30.06 | 28.01 |
| Kinematic viscosity, 100° C. | mm$^2$/s | 4.565 | 4.443 |
| Viscosity index |  | 34 | 40 |
| Total acid number, | mgKOH/g | 0.01 | 0.01 |
| Water content, | ppm | 25 | 25 |

Moreover, the following three kinds were prepared as additives.

Sorbitan compound A: polyoxyethylene sorbitan monooleate

Sorbitan compound B: polyoxyethylene sorbitan trioleate

Glycerin fatty acid ester (in Table 3, "glycerin ester"): a mixture of glycerin monooleate and glycerin monolinoleate And as shown in Table 3, a sample oil (refrigeration oil composition) was prepared with the above-mentioned naphthenic mineral oil, the polyol ester oil, and the additive, and the following adhesion tests were done.

[Adhesion Test]

First, a Pyrex pressure-resistant glass tube (inner diameter: 6 to 10 mm, length: 230 to 260 mm, thickness: 2 to 3 mm) was prepared. The inside thereof was washed with distilled water, and the glass tube was dried in a drying oven set at 105° C. to 120° C. for about 24 hours, and then allowed to cool in a desiccator. Then, about 0.9 g of the sample oil was sampled in the glass tube, and the inside of the glass tube was vacuum-degassed for 1 minute. After degassing, the glass tube was cooled with dry ice for 5 minutes, and the refrigerant shown in Table 3 was charged to be about 80 mass % with respect to the test oil. After the refrigerant was charged, the glass tube was cooled with dry ice for 5 minutes, and the glass tube was fused and sealed with a hand burner. Then, the glass tube sealed with the sample oil and the refrigerant was placed in a constant-temperature bath at −20° C., +20° C., +40° C. and stood for two hours respectively, and then an adhesion state of an oil droplets to a side wall of the glass tube was observed.

The results are also shown in Table 3, those having no adhesion of oil droplets as shown in FIG. 1 were indicated as "⊚", those in which a slight amount of adhesion was observed but less than that in the case without additive were indicated as "○", and those in which the amount of adhesion is equal to or greater than that in the case without additive were indicated as "X".

TABLE 3

| Base oil | Base oil A |  |  |  |  |  |  |  |  |
|---|---|---|---|---|---|---|---|---|---|
| Refrigerant | R410A |  |  |  |  |  |  |  |  |
|  | Additive |  |  |  |  |  |  |  |  |
|  | Sorbitan compound A |  |  | Sorbitan compound B |  |  | Glycerin ester |  |  |
| Additive dosage % | 0 | 0.5 | 1 | 0 | 0.5 | 1 | 0 | 0.5 | 1 |
| −20° C. | X | ○ | ○ | X | ○ | ○ | X | X | X |
| +20° C. | X | ○ | ○ | X | ○ | ○ | X | ○ | ○ |
| +40° C. | X | ○ | ○ | X | ○ | ○ | X | ○ | ○ |

| Base oil | Base oil B |  |  |  |  |  |  |  |  |
|---|---|---|---|---|---|---|---|---|---|
| Refrigerant | R410A |  |  |  |  |  |  |  |  |
|  | Additive |  |  |  |  |  |  |  |  |
|  | Sorbitan compound A |  |  | Sorbitan compound B |  |  | Glycerin ester |  |  |
| Additive dosage % | 0 | 0.5 | 1 | 0 | 0.5 | 1 | 0 | 0.5 | 1 |
| −20° C. | X | ⊚ | ⊚ | X | ○ | ○ | X | X | X |
| +20° C. | X | ○ | ○ | X | ○ | ○ | X | ○ | ○ |
| +40° C. | X | ○ | ○ | X | ○ | ○ | X | ○ | ○ |

| Base oil | Base oil A |  |  |  |  |  |  |  |  |
|---|---|---|---|---|---|---|---|---|---|
| Refrigerant | R1234yf |  |  |  |  |  |  |  |  |
|  | Additive |  |  |  |  |  |  |  |  |
|  | Sorbitan compound A |  |  | Sorbitan compound B |  |  | Glycerin ester |  |  |
| Additive dosage % | 0 | 0.5 | 1 | 0 | 0.5 | 1 | 0 | 0.5 | 1 |
| −20° C. | X | ○ | ○ | X | ○ | ○ | X | X | X |
| +20° C. | ⊚ | ⊚ | ⊚ | ⊚ | ⊚ | ⊚ | ⊚ | ⊚ | ⊚ |
| +40° C. | ⊚ | ⊚ | ⊚ | ⊚ | ⊚ | ⊚ | ⊚ | ⊚ | ⊚ |

| Base oil | Base oil B |  |  |  |  |  |  |  |  |
|---|---|---|---|---|---|---|---|---|---|
| Refrigerant | R1234yf |  |  |  |  |  |  |  |  |
|  | Additive |  |  |  |  |  |  |  |  |
|  | Sorbitan compound A |  |  | Sorbitan compound B |  |  | Glycerin ester |  |  |
| Additive dosage % | 0 | 0.5 | 1 | 0 | 0.5 | 1 | 0 | 0.5 | 1 |
| −20° C. | X | ○ | ○ | X | ○ | ○ | X | X | X |
| +20° C. | ⊚ | ⊚ | ⊚ | ⊚ | ⊚ | ⊚ | ⊚ | ⊚ | ⊚ |
| +40° C. | ⊚ | ⊚ | ⊚ | ⊚ | ⊚ | ⊚ | ⊚ | ⊚ | ⊚ |

The additive dosage is "mass %".

From Table 3, by mixing a naphthenic mineral oil and a polyol ester oil and further adding a sorbitan compound or a glycerin fatty acid ester, the adhesion of oil droplets is reduced, the compatibility with the refrigerant and the adhesion prevention are improved. In particular, a sorbitan compound is effective in improving the compatibility with the refrigerant at low temperature and preventing adhesion compared to the glycerin fatty acid ester, and is preferred.

The same adhesion test was conducted using a mixture of naphthenic oil-A and a polyvinyl ether oil as a base oil. Table 4 shows the properties of the polyvinyl ether oil (PVE).

TABLE 4

|  |  | PVE |
|---|---|---|
| Density, 15° C. | g/cm³ | 0.9316 |
| Color, | ASTM | L0.5 |
| Flash point, COC | ° C. | 198 |
| Pour point, | ° C. | −37.5 |
| Kinematic viscosity, 40° C. | mm²/s | 51.22 |
| Kinematic viscosity, 100° C. | mm²/s | 6.893 |
| Viscosity index |  | 86 |
| Total acid number, | mgKOH/g | 0.01 |
| Water content, | ppm | 25 |

First, a base oil C was prepared by mixing 80 mass % of the naphthenic oil-A and 20 mass % of the polyvinyl ether oil. Table 5 shows the properties of the base oil C.

TABLE 5

|  |  | Base oil C |
|---|---|---|
| Naphthenic oil-A | mass % | 80 |
| PVE | mass % | 20 |
| Density, 15° C. | g/cm³ | 0.9168 |
| Color, | ASTM | L0.5 |
| Flash point, COC | ° C. | 192 |
| Pour point, | ° C. | −40 |
| Kinematic viscosity, 40° C. | mm²/s | 29.71 |
| Kinematic viscosity, 100° C. | mm²/s | 4.581 |
| Viscosity index |  | 41 |
| Total acid number, | mgKOH/g | 0.01 |
| Water content, | ppm | 25 |

The same additive (the sorbitan compound A, the sorbitan compound B or the glycerin fatty acid ester) as described above was added to the base oil C to prepare a sample oil, and the same adhesion test as described above was conducted. The results are shown in Table 6.

TABLE 6

| Base oil | Base oil C | | | | | | | | |
|---|---|---|---|---|---|---|---|---|---|
| Refrigerant | R410A | | | | | | | | |
|  | Additive | | | | | | | | |
|  | Sorbitan compound A | | | Sorbitan compound B | | | Glycerin ester | | |
| Additive dosage % | 0 | 0.5 | 1 | 0 | 0.5 | 1 | 0 | 0.5 | 1 |
| −20° C. | X | ○ | ○ | X | ○ | ○ | X | ○ | ○ |
| +20° C. | X | ○ | ○ | X | ○ | ○ | X | ○ | ○ |
| +40° C. | ◎ | ◎ | ◎ | ◎ | ◎ | ◎ | ◎ | ◎ | ◎ |

| Base oil | Base oil C | | | | | | | | |
|---|---|---|---|---|---|---|---|---|---|
| Refrigerant | R1234yf | | | | | | | | |
|  | Additive | | | | | | | | |
|  | Sorbitan compound A | | | Sorbitan compound B | | | Glycerin ester | | |
| Additive dosage % | 0 | 0.5 | 1 | 0 | 0.5 | 1 | 0 | 0.5 | 1 |
| −20° C. | X | ◎ | ◎ | X | ○ | ○ | X | ○ | ○ |
| +20° C. | ◎ | ◎ | ◎ | ◎ | ◎ | ◎ | ◎ | ◎ | ◎ |
| +40° C. | ◎ | ◎ | ◎ | ◎ | ◎ | ◎ | ◎ | ◎ | ◎ |

The additive dosage is "mass %".

From Table 6, it can be seen that by mixing the naphthenic mineral oil and the polyvinyl ether oil and further adding the sorbitan compound or the glycerin fatty acid ester, the compatibility with the refrigerant is improved, and the adhesion of the oil droplets is further reduced. In particular, the sorbitan compound is effective in improving the compatibility with the refrigerant at low temperature and preventing adhesion compared to the glycerin fatty acid ester, and is preferred.

(Test 2)

In the test, as shown in Table 7, the base oil A used in Test 1 was used as the base oil, and a working fluid to which 1.0 mass % of the sorbitan compound A was added was used as the test working fluid 2, and a thermal efficiency with the non-additive test working fluid 1 was compared. The amount of base oil was 500 mL for both the test working fluids 1, 2, and R410A was used as a refrigerant.

Figure 2:
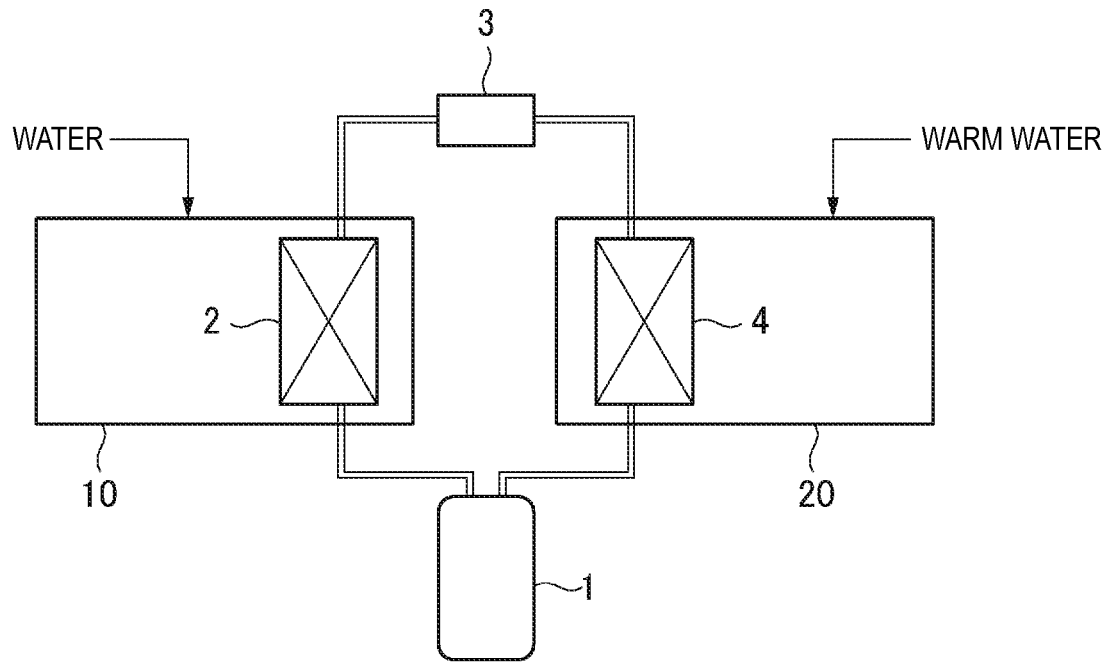
FIG. 2 is a schematic view showing a refrigeration cycle device used in the examples.

The refrigeration cycle device shown in FIG. 2 was used for the tests. The illustrated device includes a compressor 1, a condenser 2, an expansion valve 3, and an evaporator 4 as illustrated, and the condenser 2 is placed in a condensation tank 10 and the evaporator 4 is placed in an evaporation tank 20. In the test, a liquid temperature of the condensation tank 10 rises and a liquid temperature of the evaporation tank 20 decreases, but, tap water is supplied to the condensation tank 10, and warm water from the condensation tank 10 is supplied to the evaporation tank 20, to adjust the temperature to the set temperature respectively. The set temperature was 55.0° C. for the condensation tank 10, and when the temperature reached 55.5° C., tap water was supplied. The evaporation tank 20 was set at 15.0° C. and when the temperature reached 14.5° C., warm water was supplied. The pressure and temperature of each part of the device are as shown in Table 7. The current value was an inverter display value.

TABLE 7

|  | Test working fluid 1 | Test working fluid 2 |
|---|---|---|
| Base oil | Base oil A | Base oil B |
| Sorbitan compound | NA | 1.0 mass % |
| Refrigerant amount | 750 g | 750 g |
| Discharge pressure | 3.50 MPa(G) | 3.50 MPa(G) |
| Charge pressure | 1.12 MPa(G) | 1.12 MPa(G) |
| Discharge temperature | 78.7° C. | 79.8° C. |
| Charge temperature | 14.0° C. | 15.0° C. |
| Valve inlet temperature | 52.4° C. | 51.9° C. |
| Valve outlet temperature | 15.3° C. | 15.2° C. |
| Shell temperature | 64.2° C. | 64.3° C. |
| Current | 6.40 A | 6.40 A |
| Current (Width) | 6.35~6.45 A | 6.35~6.46 A |

Then, the test working fluid 1, 2 was filled in the device, and a supply interval of the tap water to the condensation tank 10 and a supply interval of the warm water to the evaporator tank 20 were measured. The shorter the supply interval, the faster the change from the set temperature and the higher the thermal efficiency. The number of tests is three, and the values for each test and the average values (seconds) are shown below.

TABLE 8

|  | 1 | 2 | 3 | Average value |
|---|---|---|---|---|
| Test working fluid 1 (without sorbitan compound) [sec.] | | | | |
| Condensation tank | 614 | 523 | 593 | 576.7 |
| Evaporation tank | 615 | 788 | 582 | 661.7 |
| Test working fluid 2 (with sorbitan compound) [sec.] | | | | |
| Condensation tank | 471 | 514 | 399 | 461.3 |
| Evaporation tank | 575 | 492 | 506 | 524.3 |

It can be seen that the test working fluid 2 to which the sorbitan compound has been added has a shorter supply interval of about 20% than that of the non-additive test working fluid 1 and has excellent thermal efficiency.

In addition, when the supply of warm water to the evaporation tank 20 was stopped and the operation was performed for 11 minutes (660 seconds) without temperature control, the difference in liquid temperature between the test working fluid 1 and the test working fluid 2 was 0.2° C. The capacity of the evaporation tank 20 is 35 cm×36 cm×72 cm=90,720 cm³, and even when the piping is subtracted, heat exchange is performed for about 90 kg of water in the evaporation tank 20. When the heat efficiency is converted into heat quantity, "90 (kg)×0.2 (*C)=18 kcal=75.312 kJ" is obtained, and the effect of the sorbitan compound on heat exchange is sufficiently exhibited.

Further, as shown in Table 9, a sorbitan compound was added to the base oil C, and the test working fluid 4 was prepared by adding the refrigerant R410A, and the thermal efficiency with the test working fluid 3 to which no sorbitan compound was added was compared. The amount of the base oil is 500 mL in both cases.

In the test, the refrigeration cycle device shown in FIG. 2 were used. The set temperature was 55° C. for the condensation tank 10, and when the temperature reached 55.5° C., tap water was supplied. The evaporation tank 20 was set at 15.0° C., and when the temperature reached 14.5° C., warm water in the condensation tank was supplied by a pump. Then, the supply interval of tap water and the supply interval of warm water were measured in the same manner as described above. The results are shown in Table 10.

TABLE 9

| | Test working fluid 3 | Test working fluid 4 |
|---|---|---|
| Base oil | Base oil C | Base oil C |
| Sorbitan compound | NA | 1.0 mass % |
| Refrigerant amount | 765 g | 765 g |
| Discharge pressure | 3.58 MPa(G) | 3.56 MPa(G) |
| Charge pressure | 1.10 MPa(G) | 1.10 MPa(G) |
| Discharge temperature | 82.3° C. | 83.4° C. |
| Charge temperature | 16.0° C. | 17.0° C. |
| Valve inlet temperature | 54.0° C. | 54.0° C. |
| Valve outlet temperature | 14.9° C. | 15.1° C. |
| Shell temperature | 66.3° C. | 68.2° C. |
| Current | 6.47 A | 6.46 A |
| Current (Width) | 6.34~6.54 A | 6.36~6.53 A |

TABLE 10

|  | 1 | 2 | 3 | Average value |
|---|---|---|---|---|
| Test working fluid 3 (without sorbitan compound) [sec.] | | | | |
| Condensation tank | 668 | 580 | 566 | 604.7 |
| Evaporation tank | 697 | 601 | 592 | 630.0 |
| Test working fluid 4 (with sorbitan compound) [sec.] | | | | |
| Condensation tank | 642 | 554 | 633 | 609.7 |
| Evaporation tank | 524 | 636 | 513 | 557.7 |

As shown in Table 10, the presence or absence of the addition of the sorbitan compound appears as a difference in the control cycle of the evaporation tank from the comparison of the test working fluids 3, 4. Even though there is no difference in the expansion valve outlet temperature due to the presence or absence of the sorbitan compound, the shorter the control cycle of the evaporation tank (the shorter the working interval of the pump for introducing warm water) indicates addition of the sorbitan compound is better for the heat exchange rate in the piping of the evaporation tank.

Moreover, when the supply of the warm water to the evaporation tank 20 was stopped and the operation was performed for 10.5 minutes (630 seconds) without temperature control, in the test working fluid 4, the liquid temperature of the evaporation tank 20 is 14.4° C., which corresponds to improvement in the thermal efficiency of 0.1° C. as compared with the test working fluid 3. As described above, in the evaporation tank, heat exchange is performed for about 90 kg of water, and when the thermal efficiency is converted into heat quantity, "90×0.1=9 kcal=37.656 KJ" is obtained, and the effect of the sorbitan compound on heat exchange is sufficiently exhibited.

(Test 3)

In the test, in order to verify the effect of an oil discharge inhibitor, the base oils A, PVE, and POE-B were used, and the oil discharge amount was compared with the sample oil in which polyisobutylene (average molecular weight 2,000, 000:0.25% by weight as paraffinic mineral oil diluent) used as the oil discharge inhibitor for the base oil A was added at 0.025 mass % of the total amount. It has been confirmed that the addition of the oil discharge inhibitor does not affect an adhesion preventing effect.

Figure 3:
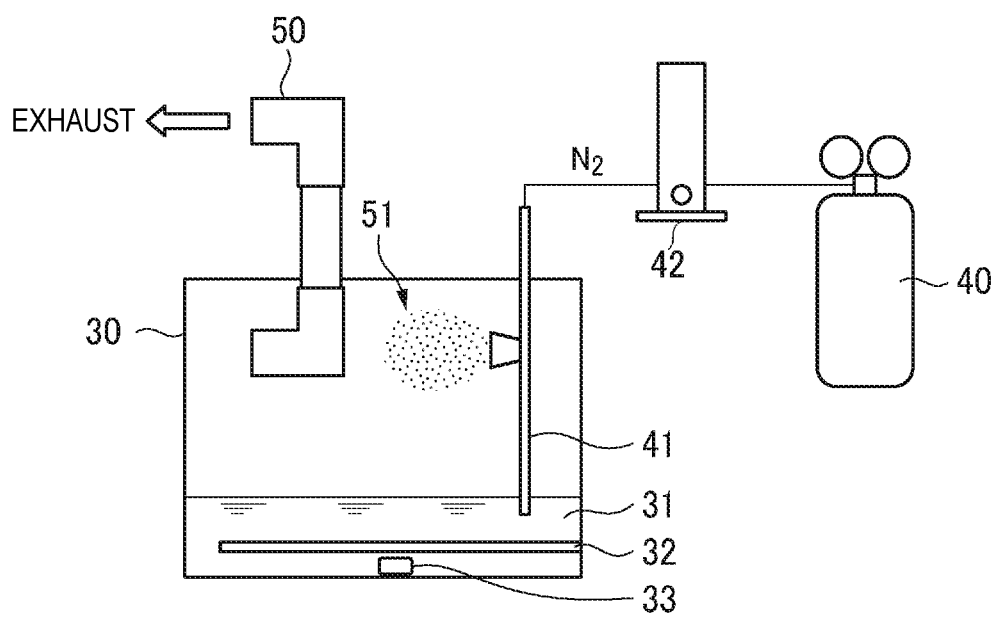
FIG. 3 is a schematic view showing an oil discharge test device used in the examples.

The test device shown in FIG. 3 was used for the test. In the illustrated test device, a predetermined amount of a sample oil 31 is stored in a transparent container 30, and a spray nozzle 41 is installed in a state where the lower end thereof is immersed in the sample oil 31. The sample oil 31 is heated by an oil heater 32 and is stirred by a stirrer 33 and held at a constant temperature. The sample oil 31 is sucked up to the spray nozzle 41 by the capillary effect. A nitrogen gas ($N_2$) is supplied from a gas cylinder 40 to the spray nozzle 41, and the sucked sample oil 31 is mixed with the nitrogen gas inside the spray nozzle 41 to form a mist 51, and is sprayed from the spray nozzle 41. The sprayed mist 51 is exhausted from an exhaust pipe 50.

In the test method, first, about 2 kg of the sample oil 31 is injected into the container 30, and the weight of the sample oil 31 (the oil weight before the test) at that time is measured. Then, the sample oil 31 is heated by the oil heater 32, and the oil temperature is set to 40° C. while being stirred by the stirrer 33, and the heating and stirring are performed. Next, nitrogen gas is sent from the gas cylinder 40 to the spray nozzle 41 at a flow rate of 10 L/min (flow rate is controlled by a flow meter 41), and the mist 51 is sprayed from the spray nozzle 41. Then, nitrogen gas is continuously supplied into the container 30 for 30 minutes from the time when the mist 51 is sprayed from the spray nozzle 41, and the heating and stirring and the supply of the nitrogen gas are stopped after 30 minutes while exhausting. After stopping, a weight of the sample oil 31 (the oil weight after the test) is measured. Then, the difference between the pre-test oil weight and the post-test oil weight is calculated. The difference is the discharge amount of the sample oil 31 discharged as the mist 51. The smaller the difference, the higher the discharge suppression effect, which is preferable.

The results are shown in Table 11, and it can be seen that the discharge amount of the sample oil 31 is reduced by the oil discharge inhibitor.

TABLE 11

| Test oil | Pre-test oil weight, g | Post-test oil weight, g | Oil discharge amount, g | Oil discharge rate, % |
| --- | --- | --- | --- | --- |
| Base oil A | 2017.5 | 2012 | 5.5 | 0.27 |
| Base oil A + oil discharge inhibitor | 2037 | 2034.5 | 2.5 | 0.12 |
| PVE | 2047.5 | 2040 | 7.5 | 0.37 |
| POE-B | 2031.5 | 2025.5 | 6 | 0.30 |

Although the present invention has been described in detail with reference to specific embodiments, it will be apparent to those skilled in the art that various changes and modifications can be made without departing from the spirit and scope of the present invention.

This application is based on Japanese Patent Application No. 2017-93267 filed on May 9, 2017, and Japanese Patent Application No. 2017-169519 filed on Sep. 4, 2017, the contents of which are incorporated herein by reference.

INDUSTRIAL APPLICABILITY

Since the working fluid for a refrigeration system according to the present invention can suppress an adhesion of a naphthenic mineral oil to an inner surface of a heat exchanger, the present invention can maintain the performance for a long time regardless of the type of the refrigerating apparatus.

REFERENCE SIGNS LIST

1 Compressor
2 Condenser
3 Expansion valve
4 Evaporator
10 Condensation tank
20 Evaporation tank
30 Container
31 Sample oil
32 Oil heater
33 Stirrer
40 Gas cylinder
41 Spray nozzle
42 Flow meter
50 Exhaust pipe
51 Mist

The invention claimed is:

1. A refrigeration oil composition for one or more refrigerants selected from a hydrofluorocarbon refrigerant, a hydrofluoroolefin refrigerant and a carbon dioxide refrigerant, comprising:
   a mixture of a naphthenic mineral oil and a polyol ester oil; and
   a sorbitan compound,
   wherein the sorbitan compound is a compound of a polyoxyethylene, a sorbitan and a fatty acid wherein a content of the sorbitan compound is from 0.5 mass % to 5 mass % of a total amount of the refrigeration oil composition.

2. The refrigeration oil composition according to claim 1, wherein in the mixture, a mass ratio of the naphthenic mineral oil to the polyol ester oil is that the naphthenic mineral oil:the polyol ester oil=from 60:40 to 90:10.

3. The refrigeration oil composition according to claim 2, wherein a kinematic viscosity of the naphthenic mineral oil at 40° C. is from 5 mm$^2$/s to 460 mm$^2$/s, and a kinematic viscosity of the polyol ester oil at 40° C. is from 5 mm$^2$/s to 350 mm$^2$/s.

4. The refrigeration oil composition according to claim 2, further comprising an oil discharge inhibitor for suppressing a discharge of the mixture from a compressor.

5. A working fluid for a refrigeration system comprising:
   the refrigeration oil composition according to claim 2; and
   one or more refrigerants selected from a hydrofluorocarbon refrigerant, a hydrofluoroolefin refrigerant and a carbon dioxide refrigerant.

6. The refrigeration oil composition according to claim 1, wherein a kinematic viscosity of the naphthenic mineral oil at 40° C. is from 5 mm$^2$/s to 460 mm$^2$/s, and a kinematic viscosity of the polyol ester oil at 40° C. is from 5 mm$^2$/s to 350 mm$^2$/s.

7. The refrigeration oil composition according to claim 6, further comprising an oil discharge inhibitor for suppressing a discharge of the mixture from a compressor.

8. The refrigeration oil composition according to claim 3, further comprising an oil discharge inhibitor for suppressing a discharge of the mixture from a compressor.

9. The refrigeration oil composition according to claim 1, further comprising an oil discharge inhibitor for suppressing a discharge of the mixture from a compressor.

10. A working fluid for a refrigeration system comprising:
    the refrigeration oil composition according to claim 1; and
    one or more refrigerants selected from a hydrofluorocarbon refrigerant, a hydrofluoroolefin refrigerant and a carbon dioxide refrigerant.

* * * * *